B. H. JENKS.
Holders for Spinning Rings.

No. 134,068. Patented Dec. 17, 1872.

Witnesses.
R. T. Campbell.
J. N. Campbell.

Inventor
Barton H. Jenks
by his Attys
Mason Fenwick & Lawrence

UNITED STATES PATENT OFFICE.

BARTON H. JENKS, OF BRIDESBURG, PENNSYLVANIA.

IMPROVEMENT IN HOLDERS FOR SPINNING-RINGS.

Specification forming part of Letters Patent No. 134,068, dated December 17, 1872.

*To all whom it may concern:*

Be it known that I, BARTON H. JENKS, of Bridesburg, in the county of Philadelphia and State of Pennsylvania, have invented an Improved Spinning-Ring Attachment; and I do hereby declare that the following is a full, clear, and exact description thereof, reference being had to the accompanying drawing making part of this specification, in which—

Figure 1:
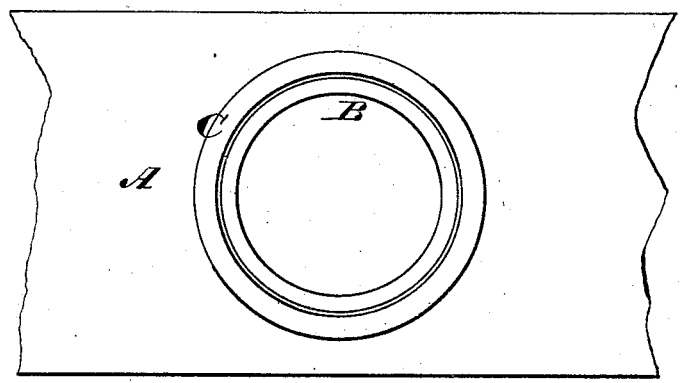
Figure 2:
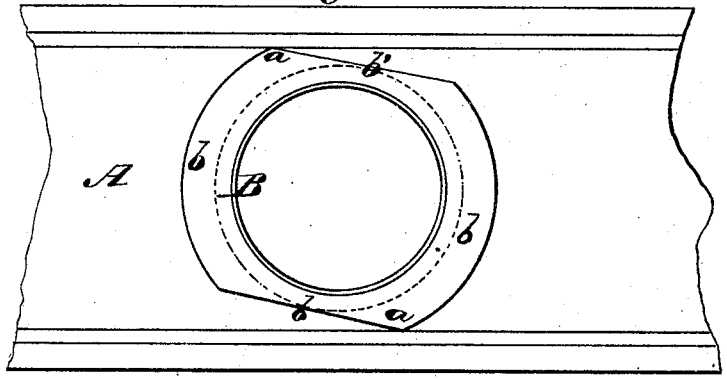
Figure 3:
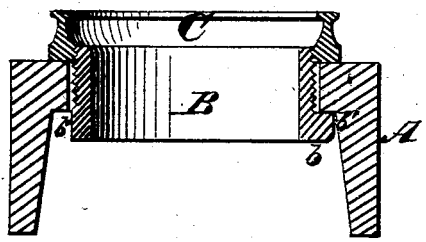
Figure 4:
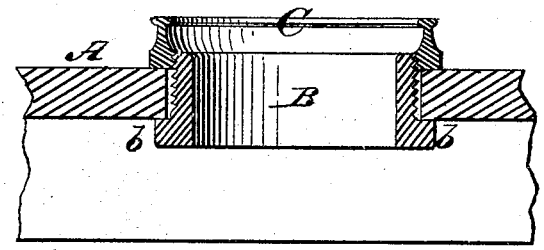

Figure 1 is a top view of a ring applied to a section of rail; Fig. 2 is a bottom view of the same; Fig. 3 is a cross-section taken vertically; and Fig. 4 is a vertical longitudinal section.

Similar letters of reference indicate corresponding parts in the several figures.

This invention relates to an improved mode of applying spinning-rings to their rails, whereby the rings can be readily adjusted so that the orbits of the travelers will be concentric to the axes of the spindles, and then secured fast in such positions, as will be hereinafter explained.

The following description of my invention will enable others skilled in the art to understand it.

In the accompanying drawing, A represents a section of ring-rails, which is cast with holes through it to receive the rings, which holes are larger in diameter than those portions of the rings which are received into them. The ring C is flanged on one edge in the usual manner for receiving the traveler, and on the inner side of its base a screw-thread is formed for receiving the male portion of a tubular nut, B. The nut B is of less diameter than the hole through the rail A, and it is of sufficient length to enter the ring C, and, by means of a flange, $b$, to draw the base of the ring down hard upon the rail. The flange $b$, which is formed on the lower end of the tubular nut B, is of greater diameter than the space between the ribs of the rail A, except at $b'$ $b'$, where the said flange is cut away, as shown in Fig. 2. This allows the screw-threaded portion of the nut to be passed through the rail, after which the ring C is screwed upon said nut, and when the two are properly adjusted with reference to the axis of the spindle the ring is screwed down hard upon its rail, where it will be rigidly held.

The object of making the flange $b$ of the nut larger in diameter at certain points than the width of the space between the flanges or ribs of the rails A is to prevent the nut from turning with the ring, either in screwing it on or off.

Having described my invention, what I claim as new, and desire to secure by Letters Patent, is—

The screw-threaded ring C combined with a flanged nut, B, substantially as described.

BARTON HOWARD JENKS.

Witnesses:
W. D. BRITTAIN,
JOS. A. DE MEGRE.